United States Patent
Lee et al.

(10) Patent No.: US 9,701,898 B2
(45) Date of Patent: Jul. 11, 2017

(54) METHODS OF GRINDING SEMICONDUCTOR NANOCRYSTAL POLYMER COMPOSITE PARTICLES

(71) Applicant: SAMSUNG ELECTRONICS CO., LTD., Suwon-si, Gyeonggi-do (KR)

(72) Inventors: Jeong Hee Lee, Seongnam-si (KR); Hyun A Kang, Suwon-si (KR); Eun Joo Jang, Suwon-si (KR); Sang Eui Lee, Hwaseong-si (KR); Shin Ae Jun, Seongnam-si (KR); Oul Cho, Seongnam-si (KR); Tae Gon Kim, Hwaseong-si (KR); Tae Hyung Kim, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 391 days.

(21) Appl. No.: 14/453,723

(22) Filed: Aug. 7, 2014

(65) Prior Publication Data
US 2015/0041715 A1    Feb. 12, 2015

(30) Foreign Application Priority Data

Aug. 8, 2013 (KR) .................. 10-2013-0094420

(51) Int. Cl.
*C09K 11/02* (2006.01)
*B24B 1/00* (2006.01)

(52) U.S. Cl.
CPC .............. *C09K 11/025* (2013.01); *B24B 1/00* (2013.01)

(58) Field of Classification Search
CPC .................. B24B 1/00; C09K 11/025
See application file for complete search history.

(56) References Cited

U.S. PATENT DOCUMENTS

| 7,785,530 B2 | 8/2010 | Keener |
| 2010/0278679 A1 | 11/2010 | Majumdar et al. |
| 2011/0081538 A1* | 4/2011 | Linton ............. C30B 7/08 428/323 |
| 2013/0105854 A1* | 5/2013 | Jang ............. H01L 33/56 257/100 |

FOREIGN PATENT DOCUMENTS

| JP | 2004-283822 A | 10/2004 |
| JP | 2013-010713 A | 1/2013 |
| KR | 10-0956578 B1 | 5/2010 |
| WO | WO 2012/052041 | * 4/2012 |

OTHER PUBLICATIONS

Prabhu et al., "Kinetics of the Oxidation of Zinc Sulfide", Ind. Eng. chem. Fundam., 23, 1984, pp. 271-273.
Yamaguchi et al, "Thermal oxidation of InP and properties of oxide film", J. Appl. Phys. vol. 51 (9), Sep. 1980, pp. 5007-5012.

* cited by examiner

*Primary Examiner* — Carol M Koslow
(74) *Attorney, Agent, or Firm* — Cantor Colburn LLP

(57) ABSTRACT

A method of grinding a semiconductor nanocrystal-polymer composite, the method including obtaining a semiconductor nanocrystal-polymer composite including a semiconductor nanocrystal and a first polymer, contacting the semiconductor nanocrystal-polymer composite with an inert organic solvent; and grinding the semiconductor nanocrystal-polymer composite in the presence of the inert organic solvent to grind the semiconductor nanocrystal-polymer composite.

22 Claims, 5 Drawing Sheets

Device1

Device2

Device3

METHODS OF GRINDING SEMICONDUCTOR NANOCRYSTAL POLYMER COMPOSITE PARTICLES

CROSS-REFERENCE TO RELATED APPLICATION

This application claims priority to and the benefit of Korean Patent Application No. 10-2013-0094420, filed on Aug. 8, 2013, and all the benefits accruing therefrom under 35 U.S.C. §119, the content of which is incorporated herein in its entirety by reference.

BACKGROUND

1. Field

A process for grinding semiconductor nanocrystal polymer composite particles is disclosed.

2. Description of the Related Art

A semiconductor nanocrystal (also known as a quantum dot) is a nano-scale crystalline semiconductor material. The semiconductor nanocrystal has a very small size and a large surface area per unit volume, and may exhibit a quantum confinement effect. As a result of its small size, the semiconductor nanocrystal has different physicochemical characteristics than a bulk material having the same composition. Since the light emitting characteristics of the quantum dot may be selected by controlling its crystal size, it may be employed in a display device or a biological light-emitting tagging device.

When the semiconductor nanocrystals are applied in a display device, resin materials, such as silicone, are used as a matrix in order to disperse the semiconductor nanocrystals therein. However, such resin materials may often exhibit poor compatibility with an organic ligand compound being present on the surface of the semiconductor nanocrystal. The poor compatibility may lead to agglomeration of the semiconductor nanocrystals or may cause a loss of the organic ligand on the surface of the semiconductor nanocrystal, and thereby the display device may show reduced efficiency. Thus the remains a need for improved method of processing semiconductor nanocrystals.

SUMMARY

An embodiment is directed to a method of uniformly grinding a semiconductor nanocrystal-polymer composite without any substantial loss of quantum dot efficiency.

Another embodiment is directed to semiconductor nanocrystal-polymer composite fine particles ground by the aforementioned method.

According to an embodiment, a method of grinding semiconductor nanocrystal-polymer composite particles is provided, the method including:

obtaining semiconductor nanocrystal-polymer composite particles including a semiconductor nanocrystal and a first polymer;

contacting the semiconductor nanocrystal-polymer composite particles with an inert organic solvent; and low-temperature grinding the semiconductor nanocrystal-polymer composite particles in the presence of the inert organic solvent to prepare semiconductor nanocrystal-polymer composite fine particles.

The obtaining of the semiconductor nanocrystal-first polymer composite particles may include:

obtaining semiconductor nanocrystals;

dissolving a first polymer in an organic solvent to prepare a first polymer solution; and mixing the first polymer solution with the semiconductor nanocrystals to obtain semiconductor nanocrystal-first polymer composite particles.

The contacting the semiconductor nanocrystal-polymer composite particles with an inert organic solvent may include an addition of a second polymer or a monomeric composition thereof.

The mixing the first polymer solution with the semiconductor nanocrystals may include heating the first polymer solution and mixing the heated first polymer solution with the semiconductor nanocrystals.

The semiconductor nanocrystals may include a Group II-VI compound, a Group III-V compound, a Group IV-VI compound, a Group IV compound or a combination thereof.

The Group II-VI compound may be selected from:

a binary element compound selected from CdSe, CdTe, ZnS, ZnSe, ZnTe, ZnO, HgS, HgSe, HgTe, MgSe, MgS, and a combination thereof;

a ternary element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof; and a quaternary element compound selected from HgZnTeS, CdZnSeS, CdZnSeTe, CdZnSTe, CdHgSeS, CdHgSeTe, CdHgSTe, HgZnSeS, HgZnSeTe, and a combination thereof.

The Group III-V compound semiconductor may be selected from:

a binary element compound selected from GaN, GaP, GaAs, GaSb, AlN, AlP, AlAs, AlSb, InN, InP, InAs, InSb, and a combination thereof;

a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a combination thereof; and a quaternary element compound selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof.

The Group IV-VI compound may be selected from:

a binary element compound selected from SnS, SnSe, SnTe, PbS, PbSe, PbTe, and a combination thereof;

a ternary element compound selected from SnSeS, SnSeTe, SnSTe, PbSeS, PbSeTe, PbSTe, SnPbS, SnPbSe, SnPbTe, and a combination thereof; and a quaternary element compound selected from SnPbSSe, SnPbSeTe, SnPbSTe, and a combination thereof.

The Group IV compound may be selected from:

a singular element compound selected from Si, Ge, and a combination thereof; and a binary element compound selected from SiC, SiGe, and a combination thereof.

The semiconductor nanocrystal may have a core-shell structure.

The semiconductor nanocrystal are able to absorb light of a wavelength of about 300 nm to about 550 nm and emit light of a wavelength of about 500 nm to about 600 nm, light of a wavelength of about 600 nm to 700 nm, or light of a wavelength of about 550 nm to 650 nm.

The first polymer may be a polyacrylate, a polymethacrylate, a polyacrylic acid, a polyacrylic acid salt, polymethacrylic acid, a polymethacrylic acid salt, a polyolefin, polystyrene, poly(alkylene-co-acrylic acid), a poly(alkylene-coacrylic acid salt), poly(alkylene-co-methacrylic acid), a poly(alkylene-co-methacrylic acid salt), poly(styrene-co-acrylic acid), poly(styrene-co-methacrylic acid), poly(styrene-co-thiol terminated ethylene), a thiol-ene copolymer, a polyamide, a polyimide, a polyisocyanate, a polythiol, a polyester, a derivative thereof, or a combination thereof.

The first polymer may have a functional group or may be modified to have a functional group, the functional group being selected from —COOR (wherein R is hydrogen, a monovalent organic group, or a monovalent to trivalent metal ion), —RCOOR' (wherein R is a substituted or unsubstituted C1 to C10 alkylene, and R' is hydrogen, a monovalent organic group, or a monovalent to a trivalent metal ion), a substituted or unsubstituted C2 to C20 alkenyl group, a substituted or unsubstituted C2 to C20 alkynyl group, a halide moiety (—F, —Cl, —Br, or —I), an —ROR' group (wherein R is a substituted or unsubstituted C1 to C10 alkylene group, and R' is hydrogen, a monovalent organic functional group, or a monovalent to trivalent metal ion), an acyl halide group (—RC(=O)X, wherein R is a substituted or unsubstituted C1 to C10 alkylene group, and X is F, Cl, Br, or I), —C(=O)NRR', wherein R and R' are each independently hydrogen, a monovalent organic functional group, or a monovalent to trivalent metal ion), an amine group (—NRR', wherein R and R' are each independently hydrogen or a monovalent organic functional group), an imine group (—C(=NR'), wherein R' is hydrogen, a monovalent organic functional group, or a monovalent to trivalent metal ion), an imide group (—C(=O)N(R')C(=O), wherein R' is hydrogen, a monovalent organic functional group, or a monovalent to trivalent metal ion), an isocyanate group (—N=C=O), an acrylate group (—OC(=O)—C(H)=CH$_2$), a methacrylate group (—OC(=O)—C(CH$_3$)=CH$_2$), a thiol group (—SH), a phosphine oxide group (—P(=O)R'R", wherein R' and R" are each independently hydrogen, a monovalent organic functional group, or a monovalent to trivalent metal ion), a sulfonate group (—SO$_3$R', wherein R' is hydrogen, a monovalent organic functional group, or a monovalent to trivalent metal ion), a nitro group (—NO$_2$), and a combination thereof.

The inert organic solvent may be a C1 to C12 aliphatic hydrocarbon, a C6 to C12 aromatic hydrocarbon, a C6 to C12 halogenated aliphatic or aromatic hydrocarbon, a C1 to C8 alcohol, a phosphine substituted with at least one C3 to C10 alkyl group, a C1 to C6 nitrile, an amine substituted with at least one C1 to C10 alkyl group, or a combination thereof.

The amount of the inert organic solvent may be about 0.5 to about 10 times the weight of the semiconductor nanocrystal-polymer composite particles.

The second polymer may be a silicone resin, an epoxy resin, poly(meth)acrylate, an organic/inorganic hybrid polymer, polycarbonate, polystyrene, a polyolefin, a copolymer of a first monomer having at least two thiol groups at a terminal end thereof and a second monomer having at least two carbon-carbon unsaturated bonds at a terminal end thereof, a derivative thereof, or a combination thereof. The monomeric composition of the second polymer may include a silicone monomer, an epoxy monomer, an acrylate monomer, an organic/inorganic hybrid monomer, monomers for the polycarbonate, a styrene monomer, an olefin monomer, a mixture of a compound with at least two thiol groups at an end thereof and a compound with at least two carbon-carbon unsaturated bonds at an end thereof, a derivative thereof, or combination thereof.

In the low temperature grinding, the amount of the second polymer may be less than or equal to about five times the weight of the semiconductor-polymer composite particles.

The low temperature grinding may be conducted at a temperature of lower than or equal to about 273 K.

The low temperature grinding may provide a population of semiconductor-polymer composite fine particles having an average diameter of about 100 μm or less when semiconductor-polymer composite fine particles having a diameter of bigger than 10 μm are measured.

In another embodiment, a population of semiconductor nanocrystal-polymer composite fine particles includes: semiconductor nanocrystal-polymer composite nanoparticles including semiconductor nanocrystals, a first polymer on the semiconductor nanocrystals, and optionally a second polymer or a monomeric composition thereof on the first polymer, wherein the population of the semiconductor nanocrystal-polymer composite has an average particle size of about 100 micrometers or less when semiconductor-polymer composite particles having a diameter of greater than 10 micrometers are measured, and wherein the population of semiconductor nanocrystal-polymer composite particles has a quantum efficiency of about 40% or greater.

The first polymer may be a polyacrylate, a polymethacrylate, a polyacrylic acid, a polyacrylic acid salt, polymethacrylic acid, a polymethacrylic acid salt, a polyolefin, polystyrene, a poly(alkylene-co-acrylic acid), a poly(alkylene-co-acrylic acid salt), a poly(alkylene-co-methacrylic acid), a poly(alkylene-co-methacrylic acid salt), poly(styrene-co-acrylic acid), poly(styrene-co-methacrylic acid), poly(styrene-co-thiol terminated ethylene), a thiol-ene copolymer, a polyamide, a polyimide, a polyisocyanate, a polythiol, a polyester, a derivative thereof, or a combination thereof.

The population of semiconductor-polymer composite fine particles may further include the second polymer or the monomeric composition thereof, and the second polymer may include a silicone resin, an epoxy resin, a poly(meth)acrylate, an organic/inorganic hybrid polymer, a polycarbonate, polystyrene, a polyolefin, a copolymer of a first monomer having at least two thiol groups at a terminal end thereof and a second monomer having at least two carbon-carbon unsaturated bonds at a terminal end thereof, a derivative thereof, or a combination thereof, and the monomeric composition of the second polymer includes a silicone monomer, an epoxy monomer, an acrylate monomer, an organic/inorganic hybrid monomer, monomers for polycarbonate, a styrene monomer, an olefin monomer, a mixture of a compound with at least two thiol groups and a compound with at least two carbon-carbon unsaturated bonds, a derivative thereof, or combination thereof.

The quantum efficiency of the population of the fine particles may be about 70% or higher with respect to the quantum efficiency of a population of composite particles prior to being ground.

In another embodiment, a method of grinding semiconductor-polymer composite particles is provided, the method including:

disposing semiconductor nanocrystal-polymer composite particles and an inert solvent in a container, and conducting a mechanical process including low-temperature grinding which is adapted to change a physical property of the semiconductor nanocrystal-polymer composite particles, wherein the solvent transfers heat during the mechanical process.

It therefore becomes possible to provide semiconductor-polymer composite particles that may maintain an improved level of light emitting efficiency.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

Figure 1:
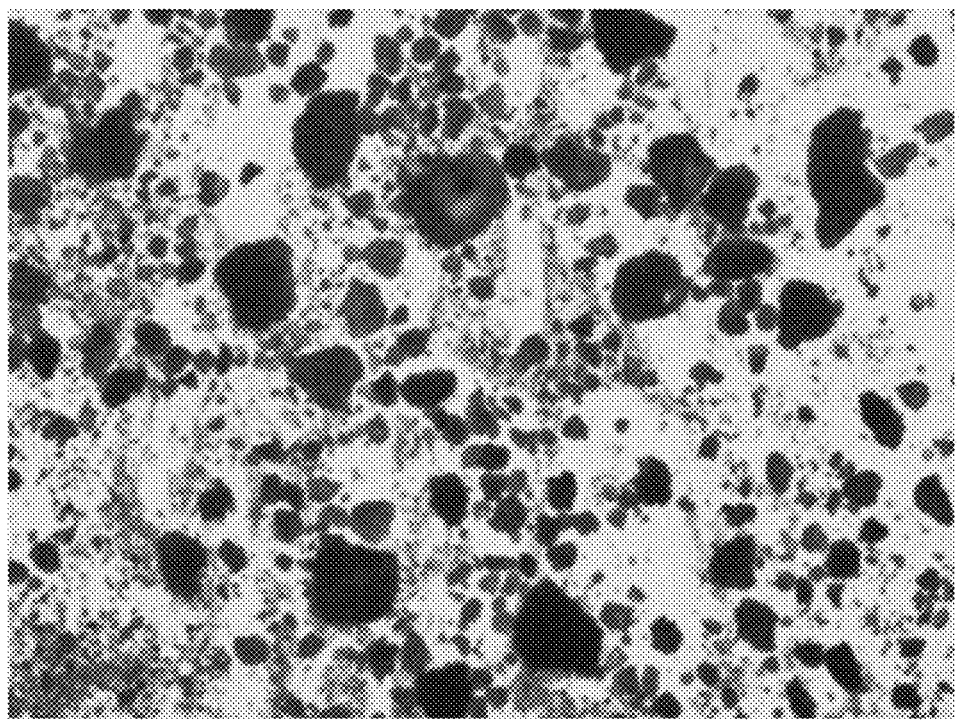
FIG. 1 is a 50× micrograph image of the composite particles obtained in Reference Example 1 (prior to low temperature grinding)

This disclosure will be described more fully hereinafter in the following detailed description, in which some but not all embodiments of this disclosure are described. This disclosure may be embodied in many different forms and is not be construed as limited to the embodiments set forth herein; rather, these embodiments are provided so that this disclosure will fully convey the scope of the invention to those skilled in the art. Thus, in some exemplary embodiments, well-known technologies are not specifically explained to avoid ambiguous understanding of the present invention. Unless otherwise defined, all terms used in the specification (including technical and scientific terms) may be used with meanings commonly understood by a person having ordinary knowledge in the art. Further, unless explicitly defined to the contrary, the terms defined in a generally-used dictionary are not ideally or excessively interpreted. In addition, unless explicitly described to the contrary, the word "comprise" and variations such as "comprises" or "comprising" will be understood to imply the inclusion of stated elements but not the exclusion of any other elements.

Unless specifically described to the contrary, a singular form includes a plural form.

As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

As used herein, the term "semiconductor nanocrystal-polymer composite fine particle" refers to a particle of a composite including a plurality of semiconductor nanocrystals dispersed in a polymer matrix, the polymer matrix having a size of a micrometer scale (e.g., about 100 micrometers or less).

As used herein, when a definition is not otherwise provided, the term "substituted" refers to a compound or group wherein at least one of hydrogen atoms thereof is substituted with a substituent selected from a C1 to C30 alkyl group, a C2 to C30 alkenyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (e.g., —F, —Cl, —Br, or —I), a hydroxyl group (—OH), a nitro group (—NO$_2$), a cyano group (—CN), an amino group (—NRR', wherein R and R' are hydrogen or a C1 to C6 alkyl group), an azido group (—N$_3$), an amidino group (—C(=NH)NH$_2$), a hydrazino group (—NHNH$_2$), a hydrazono group (=N(NH$_2$)), an aldehyde group (—C(=O)H), a carbamoyl group (—C(O)NH$_2$), a thiol group (—SH), an ester group (—C(=O)OR wherein R is a C1 to C6 alkyl group or a C6 to C12 aryl group), a carboxyl group (—C(=O)OH) or a salt thereof (—C(=O)OM wherein M is an organic or inorganic cation), a sulfonic acid group (—SO$_3$H) or a salt thereof (—SO$_3$M wherein M is an organic or inorganic cation), and a phosphoric acid group (—PO$_3$H$_2$) or a salt thereof (—PO$_3$MH or —PO$_3$M$_2$ wherein M is an organic or inorganic cation).

As used herein, the term "a monovalent organic functional group" refers to a C1 to C30 alkyl group, a C2 to C30 alkenyl group, a C2 to C30 alkynyl group, a C6 to C30 aryl group, a C7 to C30 alkylaryl group, a C1 to C30 alkoxy group, a C1 to C30 heteroaryl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, or combination thereof.

As used therein, the term "a monovalent to trivalent metal salt" refers to an ionic compound comprising an alkali or alkaline earth metal cation, a transition metal cation, or combination thereof.

As used herein, the term "hetero" refers to inclusion of one to three heteroatoms, wherein the heteroatom is N, O, S, Si, P, or combination thereof.

As used herein, the term "alkylene group" refers to a straight or branched (or cyclic) saturated aliphatic hydrocarbon group having a valence of at least two, optionally substituted with one or more substituents where indicated, provided that the valence of the alkylene group is not exceeded.

As used herein, the term "arylene group" refers to a radical having a valence of at least two, which may optionally have at least one substituent, and is formed by the removal of two hydrogen atoms from one or more rings of an aromatic hydrocarbon.

As used herein, the term "aliphatic organic group" or "aliphatic group" refers to a linear or branched C1 to C30 alkyl group.

The term "aromatic organic group" or "aromatic group" refers to a C6 to C30 aryl group or a C2 to C30 heteroaryl group.

The term "alicyclic organic group" or "alicyclic group" refers to a C3 to C30 cycloalkyl group, a C3 to C30 cycloalkenyl group, or a C3 to C30 cycloalkynyl group.

"Alkyl" as used herein means a straight or branched chain, saturated, monovalent hydrocarbon group (e.g., methyl or hexyl).

"Aryl" means a monovalent group formed by the removal of one hydrogen atom from one or more rings of an arene (e.g., phenyl or napthyl).

"Alkenyl" means a straight or branched chain, monovalent hydrocarbon group having at least one carbon-carbon double bond (e.g., ethenyl (—HC=CH2)).

"Alkynyl" means a straight or branched chain, monovalent hydrocarbon group having at least one carbon-carbon triple bond (e.g., ethynyl).

"Alkoxy" means an alkyl group that is linked via an oxygen (i.e., alkyl-O—), for example methoxy, ethoxy, and sec-butyloxy groups.

"Aryloxy" means an aryl moiety that is linked via an oxygen (i.e., —O-aryl).

As used herein, the term "carbon-carbon unsaturated bond-containing substituent" includes a C2 to C20 alkenyl group including at least one carbon-carbon double bond, a C2 to C20 alkynyl group including at least one carbon-carbon triple bond, a C4 to C20 cycloalkenyl group including at least one carbon-carbon double bond in a ring, or a C4 to C20 cycloalkynyl group including at least one carbon-carbon triple bond in a ring.

As used herein, the term "low temperature grinding" refers to "cooling or chilling a material and then reducing it into a smaller particle size." Representative Examples of the low temperature grinding includes cryogenic grinding, freeze milling, freezer grinding, and cryomilling.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise. Unless specified otherwise, the term "or" means "and/or."

In an embodiment, a method of grinding semiconductor-polymer composite particles includes: obtaining a semiconductor nanocrystal-polymer composite particles comprising a semiconductor nanocrystal and a first polymer; contacting the semiconductor nanocrystal-polymer composite particles with an inert organic solvent; and low temperature—grinding the semiconductor nanocrystal-polymer composite particles in the presence of the inert organic solvent to prepare semiconductor nanocrystal-polymer composite fine particles. The contacting can optionally include contacting with a second polymer or a monomeric composition thereof.

The semiconductor nanocrystal-polymer composite particles may be prepared by various methods. In non-limiting examples, the obtaining of the semiconductor nanocrystal-polymer composite particles may include:

obtaining semiconductor nanocrystals;

dissolving a first polymer in an organic solvent to prepare a first polymer solution; and mixing the first polymer solution with the semiconductor nanocrystals to obtain the semiconductor nanocrystal-polymer composite particles. The semiconductor nanocrystal-polymer composite may be in the form of particles. The mixing may comprise adding the first polymer solution to the semiconductor nanocrystals. Alternatively, the mixing may comprise adding the semiconductor nanocrystals to the first polymer solution.

The first polymer solution may be heated if desired before the polymer solution is mixed with the semiconductor nanocrystals. The heating may comprise heating to about 30° C. to about 150° C., or about 80° C. to about 130° C.

The semiconductor nanocrystal may include a Group II-VI compound, a Group III-V compound, a Group IV-VI compound, a Group IV compound, or a combination thereof.

The Group II-VI compound may be a binary element compound, such as CdSe, CdTe, ZnS, ZnSe, ZnTe, ZnO, HgS, HgSe, HgTe, MgSe, MgS, or a combination thereof, a ternary element compound such as CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, or a combination thereof, or a quaternary element compound such as HgZnTeS, CdZnSeS, CdZnSeTe, CdZnSTe, CdHgSeS, CdHgSeTe, CdHgSTe, HgZnSeS, HgZnSeTe, or a combination thereof. The Group III-V compound semiconductor may be a binary element compound such as GaN, GaP, GaAs, GaSb, AlN, AlP, AlAs, AlSb, InN, InP, InAs, InSb, or a combination thereof, a ternary element compound such as GaNP, GaNAs, GaNSb, GaPAs, GaPSb, AlNP, AlNAs, AlNSb, AlPAs, AlPSb, InNP, InNAs, InNSb, InPAs, InPSb, GaAlNP, or a combination thereof, or a quaternary element compound such as GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, or a combination thereof. The Group IV-VI compound may be a binary element compound such as SnS, SnSe, SnTe, PbS, PbSe, PbTe, or a combination thereof, a ternary element compound such as SnSeS, SnSeTe, SnSTe, PbSeS, PbSeTe, PbSTe, SnPbS, SnPbSe, SnPbTe, or a combination thereof, or a quaternary element compound such as SnPbSSe, SnPbSeTe, SnPbSTe, or a combination thereof. The Group IV compound may be a singular element compound such as Si, Ge, or a combination thereof, or a binary element compound such as SiC, SiGe, or a combination thereof. The binary element compound, the ternary element compound, or the quaternary element compound may be present with a uniform concentration in a particle, or they may be present with different concentrations in a single particle.

The semiconductor nanocrystals may absorb light of a wavelength of about 300 nm to about 550 nm and may emit light of a wavelength of about 500 to about 600 nm, light of a wavelength of about 600 to about 700 nm, or light of a wavelength of about 550 to about 650 nm. The wavelength of the emitted light may be selected by controlling the composition of the semiconductor nanocrystal, a size thereof, and the like.

The semiconductor nanocrystal may have a core-shell structure. For example, the semiconductor nanocrystal may have a structure having a semiconductor nanocrystal core and at least one shell surrounding the core. The core or the shell of the semiconductor nanocrystal may be a single compound. Alternatively, the core or shell of the semiconductor nanocrystal may include an alloy or a mixture having a concentration gradient.

According to an embodiment, the materials of the shell in the semiconductor nanocrystal particle may have a larger bandgap energy than a bandgap energy of the core, and thereby the semiconductor nanocrystal may exhibit the quantum confinement effect more effectively. In a multi-shell type of semiconductor nanocrystal particle, the bandgap energy of the material of an outer shell may be greater than a bandgap energy of the material of an inner shell (i.e., a shell that is closer to the core).

The semiconductor nanocrystal may have quantum efficiency of about 30% to about 100%, or about 40% to about 90%, for example about 50% or greater, or about 70% or greater, or about 90% or greater. The semiconductor nanocrystal may be selected to have a wider or narrower Full Width at Half Maximum ("FWHM") of a peak in a photoluminescence spectrum, as desired. For example, when it is used in a display device, the semiconductor nanocrystal may have a narrower FWHM in order to enhance color purity or color reproducibility. In such a context, the semiconductor nanocrystal may have a FWHM of less than or equal to about 50 nm, for example less than or equal to about 40 nm, or less than or equal to about 30 nm. The semiconductor nanocrystal may have a particle diameter (e.g., a longest diameter in a case of a non-spherical particle) ranging from about 1 nm to about 100 nm, for example about 1 nm to about 20 nm. The shape of the semiconductor nanocrystal is not limited to a particular shape. By way of an example, the nanocrystal may have a spherical shape, a pyramidal shape, a multi-arm shape, or a cubic shape. The nanocrystal may be in the form of a nanoparticle, a nanotube, a nanowire, a nanofiber, a nano-plate particle, or the like.

The methods of preparing the semiconductor nanocrystal are not particularly limited. In an embodiment, the semiconductor nanocrystal may be prepared via a wet chemical method. In this case, the semiconductor nanocrystal after the preparation may have surface-coordinated organic materials. The amount of the organic material may be less than or equal to about 50 wt %, for example less than or equal to about 40% by weight, less than or equal to about 30 wt % by weight, or less than or equal to about 20 wt %, based on a total weight of the semiconductor nanocrystal and the organic material. The organic material may include an organic ligand compound and an organic solvent. The types of the organic ligand compound and the organic solvent are not particularly limited. For example, the solvent may include, but is not limited to, a C6 to C22 primary alkyl amine such as hexadecylamine, a C6 to C22 secondary alkyl amine such as dioctyl amine, a C6 to C40 tertiary alkyl amine such as trioctylamine, a heterocyclic compound having a nitrogen atom such as pyridine, a C6 to C40 olefin such as octadecene, a phosphine substituted with a C6 to C22 alkyl group such as trioctylphosphine, a phosphine oxide substituted with a C6 to C22 alkyl group such as trioctylphosphine oxide, or a combination thereof. The ligand compound is coordinated to the surface of the nanocrystals as prepared, and, while not wanting to be bound by theory, it is understood to assist the dispersing of the nanocrystals in a solution, and may have an effect on the light-emitting and electrical characteristics of the nanocrystals. For example, the ligand compound may be a compound of the formula RCOOH, $RNH_2$, $R_2NH$, $R_3N$, RSH, $R_3PO$, $R_3P$, ROH, RCOOR', or RCOOCOR', wherein R and R' are each independently a C1 to C24 alkyl group, a C2 to C24 alkenyl group, or a C5 to C24 aryl group, or a combination thereof. The ligand compound may be used alone or in a mixture of at least two compounds.

The first polymer may be a polyacrylate, e.g., a poly((C1 to C8 alkyl) acrylate), a polymethacrylate, e.g., a poly((C1 to C8 alkyl) methacrylate) a polyacrylic acid, a polyacrylic acid salt, polymethacrylic acid, a polymethacrylic acid salt, a polyolefin, polystyrene, a poly(alkylene-co-acrylic acid), a poly(alkylene-co-acrylic acid salt), a poly(alkylene-co-methacrylic acid), a poly(alkylene-co-methacrylic acid salt), poly(styrene-co-acrylic acid), poly(styrene-co-methacrylic acid), poly(styrene-co-thiol terminated ethylene), a thiol-ene copolymer, a polyamide, a polyimide, a polyisocyanate, a polythiol, a polyester, a derivative thereof, or a combination thereof. Examples of the polyolefin may include polyethylene, polypropylene, or a copolymer thereof. The alkylene may be a C2 to C20 alkylene.

The first polymer may have or may be modified to have at least one functional group that may coordinate with the surface of the semiconductor nanocrystal or may react with the semiconductor nanocrystal. Examples of the functional group may include —COOR (wherein R is hydrogen, a monovalent organic group, or a monovalent to trivalent metal ion), —RCOOR' (wherein R is a substituted or unsubstituted C1 to C10 alkylene, and R' is hydrogen, a monovalent organic group, or a monovalent to trivalent metal ion), a substituted or unsubstituted C2 to C20 alkenyl group, a substituted or unsubstituted C2 to C20 alkynyl group, a halogen (e.g., —F, —Cl, —Br, or —I), a —ROR' group (wherein R is a substituted or unsubstituted C1 to C10 alkylene group, and R' is hydrogen, a monovalent organic functional group, or a monovalent to trivalent metal ion), an acyl halide group (e.g., a group of the formula —RC(=O)X, wherein R is a substituted or unsubstituted C1 to C10 alkylene group, and X is F, Cl, Br, or I), —C(=O)NRR', wherein R and R' are each independently hydrogen, a monovalent organic functional group, or a monovalent to trivalent metal ion, an amine group (e.g., a group of the formula —NRR', wherein R and R' are each independently hydrogen or a monovalent organic functional group), an imine group (e.g., a group of the formula —C(=NR'), wherein R' is hydrogen, a monovalent organic functional group, or a monovalent to trivalent metal ion), an imide group (e.g., a group of the formula —C(=O)N(R')C(=O), wherein R' is hydrogen, a monovalent organic functional group, or a monovalent to trivalent metal ion), an isocyanate group (e.g., group of the formula —N=C=O), an acrylate group (e.g., group of the formula —OC(=O)—C(H) =$CH_2$), a methacrylate group (e.g., a group of the formula —OC(=O)—C($CH_3$)=$CH_2$), a thiol group (e.g., a group of the formula —SH), a phosphine oxide group (e.g., a group of the formula —P(=O)R'R", wherein R' and R" are each independently hydrogen, a monovalent organic functional group, or a monovalent to trivalent metal ion), a sulfonate group (e.g., a group of the formula —$SO_3R'$, wherein R' is hydrogen, a monovalent organic functional group, or a monovalent to trivalent metal ion), a nitro group (e.g., a group of the formula —$NO_2$), or a combination thereof. Examples of the monovalent organic functional group may include a C1 to C30 alkyl group, a C2 to C30 alkenyl group, a C2 to C30 alkynyl group, a C6 to C30 aryl group, a C7 to C30 alkylaryl group, a C1 to C30 alkoxy group, a C1 to C30 heteroaryl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, or a combination thereof.

Among the first polymers, the poly(alkylene-co-acrylic acid), poly(alkylene-co-acrylic acid salt), poly(alkylene-co-methacrylic acid), and poly(alkylene-co-methacrylic acid salt) may be random copolymers or block copolymers including an alkylene repeating unit (e.g., ethylene or propylene) and a repeating unit derived from (meth)acrylic acid or a salt thereof. In the block copolymer or random copolymer, the repeating unit derived from acrylic acid, methacrylic acid, or a salt thereof may be included in an amount of about 1 mole percent (mol %) to about 100 mol %, specifically, about 2 mol % to about 50 mol %, and more specifically, about 4 mol % to about 20 mol %, based on the total amount of the copolymer. Within the above ranges, the copolymer may passivate the semiconductor nanocrystal and provide improved stability.

The polyacrylic acid salt, polymethacrylic acid salt, poly(alkylene-co-acrylic acid salt), and poly(alkylene-co-methacrylic acid salt) may include a monovalent metal capable of having an ionic bond with the carboxyl group, e.g., a group of the formula —C(=O)OH), or a di-, tri-, or higher valent metal capable of having an ionic bond or a coordination bond with the carboxyl group. Examples of the monovalent metal may include Na, K, or the like. Examples of the di-, tri-, or higher valent metal may include Mg, Ca, Sc, Ti, V, Cr, Mn, Fe, Co, Ni, Cu, Zn, Ga, Rb, Sr, Y, Zr, Nb, Mo, Cd, In, Ba, Au, Hg, Tl, or the like.

The first polymer may be dissolved in an organic solvent to prepare an organic solution of the first polymer. Types of the organic solvent for the first polymer are not particularly limited and may be selected depending on the type of monomer, the polymer structure, the molecular weight thereof, and the like. For example, a C6 to C20 aromatic hydrocarbon, such as toluene, xylene and the like, may be used, but it is not limited thereto.

The prepared first polymer solution may be heated if desired. The heating may comprise heating to about 10° C. (e.g., about 30° C.) to about 150° C., or about 80° C. to about 130° C. After the optional heating, the first polymer solution is mixed with a semiconductor nanocrystal to form a semiconductor nanocrystal-polymer composite. The semiconductor-polymer composite may be in the form of particles. The mixing process between the first polymer solution and the semiconductor nanocrystal is not particularly limited. It may include simple mixing, e.g., stirring, or the like. The ratio between the (heated) first polymer solution and the semiconductor nanocrystal is not particularly limited, and may be controlled appropriately as desired. The temperature and the duration of the mixing process are not particularly limited, and may be selected appropriately depending on the amount of the first polymer, the amount of the semiconductor nanocrystal, and the concentration of the solution. For example, the mixing may be conducted at a temperature of about 80° C. to about 150° C., about 90° C. to about 140° C., about 100° C. to about 130° C., for about 30 minutes or longer, or about 15 to about 100 minutes, but it is not limited thereto. In a selected time, the first polymer solution is cooled to a temperature of lower than about 30° C., for example −20° C. to 30° C., or −10° C. to 20° C. to recover the semiconductor-first polymer composite. The remaining solvent on the semiconductor-first polymer composite may be removed by a solvent removal process, such as filtration, drying, sublimation, or the like. The semiconductor-polymer composite may be optionally subjected to an additional grinding (e.g., manual grinding) to provide size reduction to produce the semiconductor-polymer composite, which may be in the form of particles. After the preparation, the semiconductor-polymer composite particles may have a size of about 990 micrometers or less, about 900 micrometers or less, about 800 micrometers or less, about 700 micrometers or less, about 600 micrometers or less, about 500 micrometers or less, or about 400 micrometers ($\mu m$) or less, or about 100 $\mu m$ to about 1000 $\mu m$, or about 150 $\mu m$ to about 800 $\mu m$, or about 200 $\mu m$ to about 600 $\mu m$, but it is not limited thereto. In the semiconductor nanocrystal-polymer composite particle, the amount of the semiconductor nanocrystal is not particularly limited, and it may be chosen appropriately. For example, the semiconductor nanocrystal-polymer composite particles may include about 1 wt % to about 50 wt %, or about 2 wt % to about 40 wt %, about 4 wt % to about 30 wt % of the semiconductor nanocrystals, based on the total weight of the composite particles, but it is not limited thereto.

The semiconductor nanocrystal-polymer composite particles may be further contacted with an organic solvent and an optional second polymer. After the additional contacting, the composite particles may be subjected to a low temperature grinding to reduce their particle size.

When the semiconductor nanocrystals are applied to an electronic device, such as an light emitting diode ("LED"), they may be dispersed in an encapsulant including a resin, for example, a silicone or epoxy resin. The encapsulant may be the same or different than the second polymer. In an embodiment the encapsulant and the second polymer are different. When are dispersed in the encapsulant, the semiconductor nanocrystals (i.e., quantum dots) may suffer a loss of an organic ligand which is coordinated on a surface of the semiconductor nanocrystal, which may lead to a decrease in quantum efficiency. In addition, if the quantum dots have poor compatibility or miscibility with the encapsulant, they may be susceptible to agglomeration, which may also result in a decrease in quantum efficiency of the device. In order to reduce or prevent the loss of the ligands on the surface of the quantum dots and to enhance the dispersibility of the quantum dots, the composite particles having at least one quantum dot and a polymer (i.e., the "semiconductor nanocrystal-polymer composite") are prepared and then dispersed in the encapsulant. In order to obtain more uniform light-emission, the semiconductor nanocrystal-polymer composite particles may have an average size of about 100 micrometers ($\mu m$) or less and a more uniform size distribution. However, since the semiconductor nanocrystal-polymer composite includes a polymer, it is difficult to obtain an average particle size of about 100 micrometers or less by using currently available grinding methods. In order to decrease their size to 100 micrometers or less, the semiconductor nanocrystal-polymer composite may be subject to a low temperature grinding method. However, the lower temperature grinding may cause undesired results, such as significant reduction of quantum efficiency and wavelength shift of emitted light of the semiconductor nanocrystal-polymer composite. It has been known that the decrease in the quantum efficiency may result from oxidation of the semiconductor nanocrystals occurring during the low temperature grinding. While not wanting to be bound by theory is understood that the impact energy exerted on the semiconductor nanocrystal-polymer composite during the grinding may be converted to thermal heat energy, and the surface of the semiconductor nanocrystal exposed to air or water may be susceptible to oxidation due to the heat energy. As the size of the semiconductor nanocrystal-polymer composite particle decreases as a result of the grinding progresses, the total surface area of the composite particles exposed to air or water can sharply increase. Accordingly, air or water is more likely to be adsorbed onto the surface of the quantum dots and the surface oxidation may cause the more significant decrease in quantum efficiency.

The disclosed method includes use of an inert organic solvent during the low temperature grinding, and thus it may reduce a chance for the quantum dot composite fine particles to be contacted with environmental air or water, to reduce the likelihood and/or extent of surface oxidation. In such a grinding process, the inert solvent may reduce the heat energy transformed from the impact energy during the grinding and may also prevent the surface of the quantum dot from being in contact with the air or water from the environment. Accordingly, the presence of the inert solvent reduces the oxidation which can occur during the grinding.

As used herein, the term "inert organic solvent" refers to a solvent that effectively does not dissolve the first polymer below room temperature and may not cause oxidation of the semiconductor nanocrystals. The inert organic solvent may be a C1 to C12 aliphatic hydrocarbon, a C6 to C12 aromatic hydrocarbon, a C6 to C12 halogenated (aliphatic or aromatic) hydrocarbon, a C1 to C8 alcohol, a phosphine substituted with a C3 to C10 alkyl group, a C1 to C6 nitrile, an amine substituted with a C2 to C10 alkyl or alkenyl group, or a combination thereof.

For example, the C6 to C12 aliphatic hydrocarbon may be an alkane such as hexane, heptane, octane, or nonane, a cyclic alkane such as cyclohexane, an alkene such as octadecene, a cyclic alkene such as cyclohexene, an alkyne such as hexyne, or a combination thereof. The C6 to C12 aromatic hydrocarbon may be benzene, toluene, or a combination thereof.

The C6 to C12 halogenated hydrocarbon may be chloroform, methylene chloride, or a combination thereof. The C1 to C8 alcohol may be methanol, ethanol, propanol, butanol, pentanol, or a combination thereof. The phosphine substituted with a C3 to C10 alkyl group may be trioctylphosphine. The C1 to C6 nitrile may be acetonitrile. The amine substituted with a C2 to C10 alkyl group may be trioctylamine. The inert organic solvent is an organic solvent that does not contain a substantial amount of reactive oxygen. The inert organic solvent may have a boiling point of lower than or equal to about 100° C.

In the low temperature grinding, the amount of the inert organic solvent may be about 0.5 times to about 10 times or less, for example about 0.5 times to about 5 times, or about one time to about two times the total weight of the semiconductor nanocrystal-polymer composite particles. When the semiconductor nanocrystal-polymer composite particles are in contact with the aforementioned amount of the inert organic solvent and they are subjected to the low temperature grinding, their size may be reduced to under 100 μm without causing a reduction in the quantum efficiency of the semiconductor nanocrystals.

If it is desired, the semiconductor nanocrystal-polymer composite particles may be contacted with the inert organic solvent and a second polymer (or a monomer mixture thereof), and then the combination subjected to the low temperature grinding. The second polymer may be an encapsulating material that is used for a subsequent manufacturing process for a device (e.g., silicone, epoxy, or the like), or a polymer having high affinity to the encapsulating material. In non-limiting examples, the second polymer may be a silicone resin; an epoxy resin; a poly(meth)acrylate polymer; an organic/inorganic hybrid polymer; a polycarbonate; a polystyrene; a polyolefin, such as polyethylene, polypropylene, polyisobutylene, or the like; a copolymer of a first monomer including at least two thiol (—SH) groups and a second monomer including at least two carbon-carbon unsaturated bond-containing groups, or a combination thereof. When the second polymer is also used, the resulting composite fine particles are less likely to be agglomerated when they are dispersed in the encapsulating material.

Any suitable commercially available silicone resin available for the encapsulating material may be used. In non-limiting examples, the silicone resin may be OE series products manufactured by Dow Corning, Co. Ltd. Any suitable commercially available epoxy resin available for the encapsulating material may be used. Examples of the poly(meth)acrylate polymer may include a poly(methyl methacrylate) ("PMMA"), a poly(lauryl methacrylate) ("PLMA"), or the like, or combination thereof.

Any organic/inorganic hybrid polymer suitable for use as an encapsulant material may be used. In non-limiting examples, the organic/inorganic hybrid polymer may include a first moiety including a siloxane bond (—Si—O—Si—), a second moiety including a siloxane bond and at least one organic functional group, and a third moiety including a siloxane bond and a cross-linked residue of at least one reactive functional group. The organic/inorganic hybrid polymer may further include a fourth moiety including an —O-M-O— bond, wherein M is selected from Al, Sn, Ti, Zr, Ge, B, or a combination thereof.

The organic/inorganic hybrid polymer may be a condensation polymerization polymer of a first alkoxy silane represented by the following Chemical Formula 1, a second alkoxy silane represented by the following Chemical Formula 2, and a third alkoxysilane represented by and the following Chemical Formula 3.

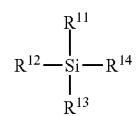

Chemical Formula 1

In Chemical Formula 1,
$R^{11}$ to $R^{14}$ are each independently a hydroxy group, a halogen, a substituted or unsubstituted C1 to C8 linear or branched alkoxy group, a substituted or unsubstituted C6 to C12 aryloxy group, a substituted or unsubstituted C2 to C10 acyl group, or a substituted or unsubstituted C2 to C10 ester group.

Examples of the alkoxy silane of Chemical Formula 1 may include tetramethoxysilane, tetraethoxysilane, tetrabutoxysilane, or the like, or a combination thereof.

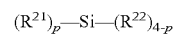

Chemical Formula 2

In Chemical Formula 2,
$R^{21}$ is a substituted or unsubstituted C6 to C20 aryl group, a substituted or unsubstituted C1 to C20 linear or branched alkyl group, for example, a fluoroalkyl group, a substituted or unsubstituted C1 to C20 aminoalkyl group, a substituted or unsubstituted C2 to C20 alkynyl group, a substituted or unsubstituted C2 to C20 alkenyl group, a substituted or unsubstituted C1 to C20 amine group, —C(=O)OR' (wherein R' is a C1 to C20 linear or branched alkyl group), or —C(=O)ONRR' (wherein R and R' are independently a C1 to C20 linear or branched alkyl group), $R^{22}$ is a hydroxy group, a halogen, a substituted or unsubstituted C1 to C8 linear or branched alkoxy group, a substituted or unsubstituted C6 to C12 aryloxy group, a substituted or unsubstituted C2 to C10 carbonylalkyl group, a substituted or unsubstituted C2 to C10 carbonyl alkoxy group, and p is an integer ranging from 1 to 3.

Examples of the alkoxy silane of Chemical Formula 2 may include methyltrimethoxysilane, ethyltrimethoxysilane, propyltrimethoxysilane, butyltrimethoxysilane, pentyltrimethoxysilane, hexyltrimethoxysilane, methyltriethoxysilane, ethyltriethoxysilane, propyltriethoxysilane, butyltriethoxysilane, pentyltriethoxysilane, hexyltriethoxysilane, dimethyldimethoxysilane, diethyldimethoxysilane, dipropyldimethoxysilane, dibutyldimethoxysilane, dipentyldimethoxysilane, dihexyldimethoxysilane, dimethyldiethoxysilane, diethyldiethoxysilane, dipropyldiethoxysilane, dibutyldiethoxysilane, dipentyldiethoxysilane, dihexyldiethoxysilane, aminomethyltrimethoxysilane, aminoethyltrimethoxysilane, aminopropyltrimethoxysilane, aminobutyltrimethoxysilane, aminopentyltrimethoxysilane, aminohexyltrimethoxysilane, aminomethyltriethoxysilane, aminoethyltriethoxysilane, aminopropyltriethoxysilane, aminobutyltriethoxysilane, aminopentyltriethoxysilane, aminohexyltriethoxysilane, phenyltrimethoxysilane, diphenyldimethoxysilane, phenyltriethoxysilane, diphenyldiethoxysilane, or the like.

$$(R^{31})_q-Si-(R^{32})_{4-q} \quad \text{Chemical Formula 3}$$

In Chemical Formula 3, $R^{31}$ is a reactive photo-cross-linking or thermal cross-linking functional group, for example a (meth)acryloxy group; an epoxy group, for example, a glycidyloxy group; a spiro orthoester group; a substituted or unsubstituted C2 to C30 alkenyl group; a substituted or unsubstituted C2 to C30 alkynyl group; a substituted or unsubstituted C3 to C30 alicyclic organic group including a double bond or a triple bond in a ring; a substituted or unsubstituted C3 to C30 heterocycloalkyl group including a double bond or a triple bond in a ring; a C3 to C30 alicyclic organic group substituted with a C2 to C30 alkenyl group or a C2 to C30 alkynyl group; or a C3 to C30 heterocycloalkyl group substituted with a C2 to C30 alkenyl group or a C2 to C30 alkynyl group, $R^{32}$ is a hydroxy group, a halogen, a substituted or unsubstituted C1 to C8 linear or branched alkoxy group, a substituted or unsubstituted C6 to C12 aryloxy group, a substituted or unsubstituted C2 to C10 carbonylalkyl group, or a substituted or unsubstituted C2 to C10 carbonylalkoxy group, and q is an integer ranging from 1 to 3.

The organic/inorganic hybrid polymer may be a condensation polymerization polymer of the alkoxy silane compounds represented by the above Chemical Formulas 1 to 3 and an alkoxide compound represented by the following Chemical Formula 4.

$$M(R)_r \quad \text{Chemical Formula 4}$$

In Chemical Formula 4,

R is a hydroxy group, a halogen, a substituted or unsubstituted C1 to C8 linear or branched alkoxy group, for example, a methoxy, ethoxy, isopropoxy, or t-butoxy, a substituted or unsubstituted C6 to C12 aryloxy group, a substituted or unsubstituted C2 to C10 carbonylalkyl group, or a substituted or unsubstituted C2 to C10 carbonylalkoxy group, M is selected from Al, Si, Sn, Ti, Zr, Ge, B, or a combination thereof, and r is determined depending on a bonding valence of M.

The first to third moieties of the organic/inorganic hybrid polymer of the second polymer may be derived from the above Chemical Formulas 1 to 3, respectively. While not wanting to be bound by theory, is understood that the first alkoxy silane represented by Chemical Formula 1 undergoes condensation polymerization to provide a first moiety including a siloxane bond (—Si—O—Si—), the second alkoxy silane represented by Chemical Formula 2 undergoes condensation polymerization to provide a second moiety including a siloxane bond and at least one organic functional group, and the third alkoxy silane represented by Chemical Formula 3 undergoes condensation polymerization to provide a third moiety including a siloxane bond and a cross-linked residue of at least one reactive functional group. Therefore, the organic functional group of the second moiety may be $R^{21}$ of Chemical Formula 2, and the cross-linked organic functional group of the third moiety is provided by crosslinking the photo-crosslinkable or thermal crosslinkable $R^{31}$ of Chemical Formula 3.

The second moiety may increase flexibility and the refractive index of a condensation polymerization polymer.

The first alkoxy silane, the second alkoxy silane, and the third alkoxy silane may be used in an amount of about 0.5 weight percent ("wt %") to about 55 wt %, about 35 wt % to about 99 wt %, and about 0.01 wt % to about 10 wt %, respectively. The first alkoxy silane may be used at an amount of about 10 wt % to about 55 wt %, specifically about 25 wt % to about 55 wt %, more specifically about 50 wt % to about 55 wt %. The second alkoxy silane may be used at an amount of about 40 wt % to about 95 wt %, specifically about 45 wt % to about 90 wt %, more specifically about 50 wt % to about 85 wt %. The third alkoxy silane may be used at an amount of about 0.1 wt % to about 9 wt %, specifically about 0.5 wt % to about 8 wt %, more specifically about 1 wt % to about 7 wt %. When the first alkoxy silane, second alkoxy silane, and third alkoxy silane undergo condensation polymerization within the above range, a polymer film having an excellent refractive index, as well as photo-stability and thermal stability, may be provided.

The polymerized product of a first monomer including at least two thiol (—SH) groups and a second monomer including at least two carbon-carbon unsaturated bond-containing groups may be used, the details of which can be determined by one of skill in the art without undue experimentation. In a non-limiting example, the first monomer including at least two thiol (—SH) groups may be represented by the following Chemical Formula A.

$$[R^1\text{---}_{k1}L_1\text{---}Y_1\text{---}(SH)_m]_{k2} \quad \text{Chemical Formula A}$$

In Chemical Formula A, $R^1$ is hydrogen, a substituted or unsubstituted linear or branched C1 to C30 alkyl group, a substituted or unsubstituted C6 to C30 aryl group, a substituted or unsubstituted C3 to C30 heteroaryl group, a substituted or unsubstituted C3 to C30 cycloalkyl group, a substituted or unsubstituted C3 to C30 heterocycloalkyl group, a substituted or unsubstituted C2 to C30 alkenyl group, a substituted or unsubstituted C2 to C30 alkynyl group, a substituted or unsubstituted C3 to C30 alicyclic organic group including a double bond or a triple bond in a ring, a substituted or unsubstituted C3 to C30 heterocycloalkyl group including a double bond or triple bond in a ring, a C3 to C30 alicyclic organic group substituted with a C2 to C30 alkenyl group or a C2 to C30 alkynyl group, a C3 to C30 heterocycloalkyl group substituted with a C2 to C30 alkenyl group or a C2 to C30 alkynyl group, a hydroxyl group, —NH₂, a substituted or unsubstituted C1 to C60 amine group (e.g., a group of the formula —NRR', wherein R and R' are each independently a linear or branched C1 to C30 alkyl group), an isocyanurate group, a (meth)acrylate group, a halogen, —ROR' (wherein R is a substituted or unsubstituted C1 to C20 alkylene group and R' is hydrogen or a linear or branched C1 to C20 alkyl group), —C(=O)OR' (wherein R' is hydrogen or a linear or branched C1 to C20 alkyl group) —CN, or —C(=O)ONRR' (wherein R and R' are each independently hydrogen or a linear or branched C1 to C20 alkyl group);

$L_1$ is a single bond, a carbon atom, a substituted or unsubstituted C1 to C30 alkylene group, a substituted or unsubstituted C6 to C30 cycloalkylene group, a substituted or unsubstituted C6 to C30 arylene group, or a substituted or unsubstituted C3 to C30 heteroarylene group;

$Y_1$ is a single bond, a substituted or unsubstituted C1 to C30 alkylene group, a substituted or unsubstituted C2 to C30 alkenylene group, or a C1 to C30 alkylene group or a C2 to C30 alkenylene group wherein at least one methylene group is replaced by a sulfonyl group (—S(=O)₂—), a carbonyl group (—C(=O)—), an ether group (—O—), a sulfide group (—S—), a sulfoxide group (—S(=O)—), an ester group (—C(=O)O—), an amide group (—C(=O)NR—) (wherein R is hydrogen or a linear or branched C1 to C10 alkyl group), an —NR— (wherein R is hydrogen or a linear or branched C1 to C10 alkyl group), or a combination thereof;

m is an integer of 1 or more;

k1 is an integer of 0 or more;

k2 is an integer of 1 or more; and the sum of m and k2 is an integer of 3 or more, provided that m does not exceed the valence of $Y_1$, and provided that the sum of k1 and k2 does not exceed the valence of $L_1$.

In non-limiting examples, the second monomer may be represented by the following Chemical Formula B.

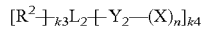  Chemical Formula B

In Chemical Formula B,

X is a C2 to C30 aliphatic organic group including a carbon-carbon unsaturated bond, a C6 to C30 aromatic organic group including a carbon-carbon double bond or a carbon-carbon triple bond, or a C3 to C30 alicyclic organic group including a carbon-carbon double bond or a carbon-carbon triple bond;

$R^2$ is hydrogen, a substituted or unsubstituted linear or branched C1 to C30 alkyl group, a substituted or unsubstituted C6 to C30 aryl group, a substituted or unsubstituted C3 to C30 heteroaryl group, a substituted or unsubstituted C3 to C30 cycloalkyl group, a substituted or unsubstituted C3 to C30 heterocycloalkyl group, a substituted or unsubstituted C2 to C30 alkenyl group, a substituted or unsubstituted C2 to C30 alkynyl group, a substituted or unsubstituted C3 to C30 alicyclic organic group including a double bond or triple bond in a ring, a substituted or unsubstituted C3 to C30 heterocycloalkyl group including a double bond or triple bond in a ring, a C3 to C30 alicyclic organic group substituted with a C2 to C30 alkenyl group or a C2 to C30 alkynyl group, a C3 to C30 heterocycloalkyl group substituted with a C2 to C30 alkenyl group or a C2 to C30 alkynyl group, a hydroxyl group, —$NH_2$, a substituted or unsubstituted C1 to C60 amine group (—NRR', wherein R and R' are each independently a linear or branched C1 to C30 alkyl group), an isocyanate group, an isocyanurate group, (meth)acryloyloxy group, a halogen, —ROR' (wherein R is a substituted or unsubstituted C1 to C20 alkylene group and R' is hydrogen or a linear or branched C1 to C20 alkyl group), an acyl halide group (—RC(=O)X, wherein R is a substituted or unsubstituted alkylene group and X is a halogen), —C(=O)OR' (wherein R' is hydrogen or a linear or branched C1 to C20 alkyl group), —CN, or —C(=O)ONRR' (wherein R and R' are each independently hydrogen or a linear or branched C1 to C20 alkyl group);

$L_2$ is a single bond, a carbon atom, a substituted or unsubstituted C1 to C30 alkylene group, a substituted or unsubstituted C1 to C30 cycloalkylene group, a substituted or unsubstituted C6 to C30 arylene group, or a substituted or unsubstituted C3 to C30 heteroarylene group;

$Y_2$ is a single bond, a substituted or unsubstituted C1 to C30 alkylene group, a substituted or unsubstituted C2 to C30 alkenylene group, or a C1 to C30 alkylene group or a C2 to C30 alkenylene group wherein at least one methylene group is replaced by a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group (—C(=O)NR—) (wherein R is hydrogen or a linear or branched C1 to C10 alkyl group), —NR— (wherein R is hydrogen or a linear or branched C1 to C10 alkyl group), or a combination thereof;

n is an integer of 1 or more;

k3 is an integer of 0 or more;

k4 is an integer of 1 or more; and the sum of n and k4 is an integer of 3 or more, provided that n does not exceed the valence of $Y_2$, and provided that the sum of k3 and k4 does not exceed the valence of $L_2$.

The aforementioned monomer may have a hydrophilic group.

The first monomer of the above Chemical Formula A may include a monomer of the following Chemical Formula A-1.

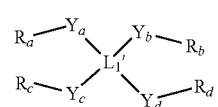  Chemical Formula A-1

In Chemical Formula A-1, $L_1'$ is a carbon atom, a substituted or unsubstituted C6 to C30 arylene group such as a substituted or unsubstituted phenylene group, a substituted or unsubstituted C3 to C30 heteroarylene group such as trioxotriazine, a substituted or unsubstituted C3 to C30 cycloalkylene group, or a substituted or unsubstituted C3 to C30 heterocycloalkylene group; and $Y_a$ to $Y_d$ are each independently a substituted or unsubstituted C1 to C30 alkylene group, a substituted or unsubstituted C2 to C30 alkenylene group, or a C1 to C30 alkylene group or a C2 to C30 alkenylene group wherein at least one methylene group is replaced by a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group (—C(=O)NR—) (wherein R is hydrogen or a linear or branched C1 to C10 alkyl group), or an imine group (—NR—) (wherein R is hydrogen or a linear or branched C1 to C10 alkyl group.); and $R_a$ to $R_d$ are each independently a thiol group (SH) or $R_1$ of Chemical Formula A, wherein at least two of $R_a$ to $R_d$ are thiol groups (SH).

Specific examples of the first monomer represented by the above Chemical Formula A may include the compounds represented by the following Chemical Formulae A-2 to A-5.

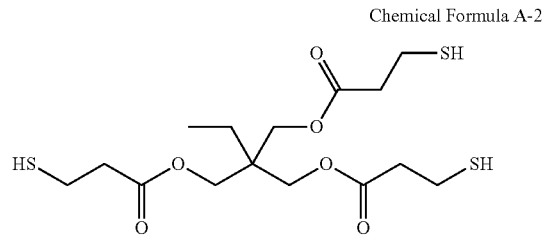

Chemical Formula A-2

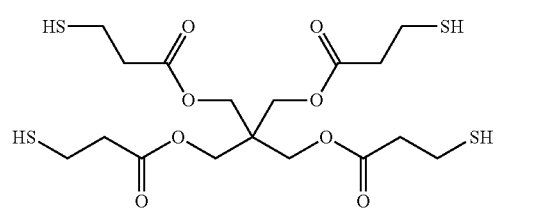

Chemical Formula A-3

Chemical Formula A-4

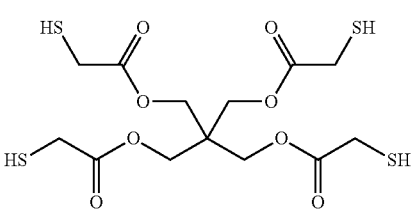

Chemical Formula A-5

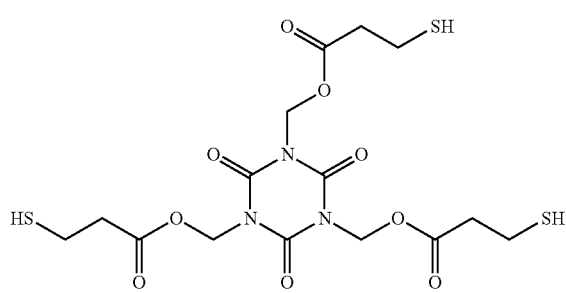

Chemical Formula B-1

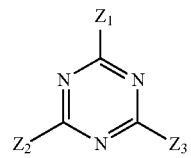

Chemical Formula B-2

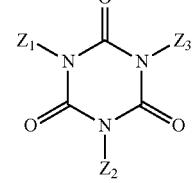

In Chemical Formulas B-1 and B-2, $Z_1$ to $Z_3$ are each independently *—$Y_2$—$X_n$ as defined for the above Chemical Formula B, wherein * represents the point of attachment to $L_2$.

Examples of the second monomer of the above Chemical Formula 2 may include the compounds represented by the following Chemical Formulas B-3 to B-5.

Regarding the second monomer, in the above Chemical Formula B, X may be selected from a C2 to C30 aliphatic organic group including a carbon-carbon double bond or a carbon-carbon triple bond, a C6 to C30 aromatic organic group including a carbon-carbon double bond or a carbon-carbon triple bond, or a C3 to C30 alicyclic organic group including a carbon-carbon double bond or a carbon-carbon triple bond. X may be an acryloxy group, a methacryloxy group, a substituted or unsubstituted C2 to C30 alkenyl group, a substituted or unsubstituted C2 to C30 alkynyl group, a substituted or unsubstituted C3 to C30 alicyclic organic group including a double bond or triple bond in a ring, a substituted or unsubstituted C3 to C30 heterocycloalkyl group including a double bond or triple bond in a ring, a C3 to C30 alicyclic organic group substituted with a C2 to C30 alkenyl group or a C2 to C30 alkynyl group, and a C3 to C30 heterocycloalkyl group substituted with a C2 to C30 alkenyl group or a C2 to C30 alkynyl group.

In the definitions of X of Chemical Formula B, the alkenyl group may be a vinyl group, an allyl group, a 2-butenyl group, or a combination thereof. The C3 to C30 alicyclic organic group including a double bond or a triple bond may also be a norbornene group, a maleimide group, a nadimide group, a tetrahydrophthalimide group, or a combination thereof.

In Chemical Formula B, $L_2$ may be a substituted or unsubstituted pyrrolidinyl group, a substituted or unsubstituted tetrahydrofuranyl group, a substituted or unsubstituted pyridyl group, a substituted or unsubstituted pyrimidyl group, a substituted or unsubstituted piperidyl group, a substituted or unsubstituted triazinyl group, a substituted or unsubstituted trioxotriazinyl group, or a substituted or unsubstituted isocyanurate group.

Examples of the second monomer of the above Chemical Formula B may include the compounds represented by the following Chemical Formulas B-1 and B-2.

Chemical Formula B-3

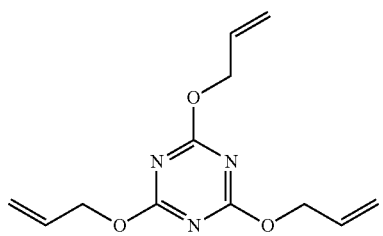

Chemical Formula B-4

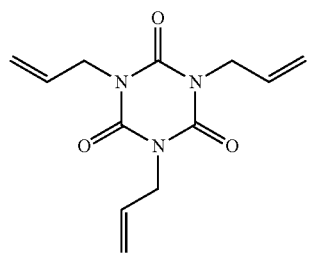

Chemical Formula B-5

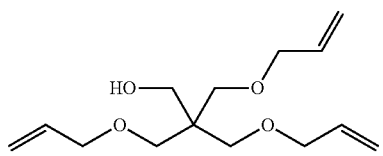

The first monomer and the second monomer may be used so that the thiol group of the first monomer and the unsaturated carbon-carbon bond of the second monomer may be present at a mole ratio of about 1:0.75 to about 1:1.25. When the above first and second monomers are used within the mole ratio range, a polymer having excellent mechanical strength and properties with a high density network may be provided.

The polymer may be a polymerized product which is obtained by further polymerizing a third monomer having one thiol group located at a terminal end of the third monomer, a fourth monomer having one unsaturated carbon-carbon bond located at a terminal end of the fourth monomer, or a combination thereof.

The third monomer may be a compound in which each of m and k2 is 1 in Chemical Formula A, and the fourth monomer may be a compound in which each of n and k4 is 1 in Chemical Formula B.

When the semiconductor nanocrystal-polymer composite is brought into contact with the inert organic solvent and the second monomer (or a monomer mixture thereof) and they are subjected to the low temperature grinding, the prepared composite fine particles may have enhanced compatibility with the encapsulating material. The composite particles may be further dispersed with improved uniformity and without agglomeration, and thereby may show improved light-emitting efficiency.

In the low temperature grinding, the amount of the second polymer may be included in an amount of about five times or less, for example about two times or less, or about 0.5 times or less, or 0.1 to 5 times, or 1 to 4 times the weight of the semiconductor-first polymer composite fine particles.

The low temperature grinding may be conducted at a temperature of less than or equal to about 273 K, for example, less than or equal to about 253 K, less than or equal to about 195 K, or less than or equal to about 77 K, or about 40 K to about 273 K, or about 77 K to about 253 K. The low temperature grinding may be conducted using any suitable apparatus. Various low temperature grinding apparatuses are commercially available. For example, the low temperature grinding may be by cryogenic grinding conducted in a high energy ball mill. In the cryogenic grinding conducted in a high energy ball mill, the milling power may be controlled based on the amount of the composite fine particles, the amount of the inert solvent, the types of the grinding media, or the like. Unlike other methods, the method according to the aforementioned embodiment may provide the particles with a small average size and a small size distribution without any loss of quantum efficiency even after conducting the low temperature grinding several times.

In accordance with the aforementioned method, the low temperature grinding may produce the semiconductor nanocrystal-polymer composite fine particles having an average particle size of about 100 μm or less, about 90 μm or less, about 80 μm or less, about 70 μm or less, or about 60 μm or less when semiconductor-polymer composite fine particles having a diameter of bigger than 10 μm are measured. The quantum efficiency of the fine particles may be greater than or equal to about 70%, for example, greater than or equal to about 75%, greater than or equal to about 80%, greater than or equal to about 85%, or greater than or equal to about 90%, or 50% to 99.99%, or 60% to 99%, compared to the quantum efficiency of the particles prior to the low temperature grinding.

In an embodiment, a group of the semiconductor nanocrystal-polymer composite fine particles includes semiconductor nanocrystal-polymer composite fine particles including semiconductor nanocrystals and a first polymer on, e.g., surrounding, or entirely surrounding, the semiconductor nanocrystals. The fine particles have an average particle size of about 100 μm or less, or 1 μm to 95 μm, or 5 μm to 90 μm when semiconductor-polymer composite fine particles having a diameter of greater than 10 μm are measured, and a quantum efficiency of greater than or equal to about 40%, for example, greater than or equal to about 45%, or 40% to 99.99%, or 50% to 99%.

The quantum efficiency of the group of the fine particles may be greater than or equal to about 70%, or 50% to 99.99%, or 60% to 99% of the quantum efficiency of the composite particles prior to the grinding.

The semiconductor nanocrystal-polymer composite fine particles may further include a second polymer deposited on the semiconductor nanocrystal or the first polymer. The second polymer may surround, or entirely surround the semiconductor nanocrystals. In an embodiment, the first and second polymers surround, or entirely surround, the semiconductor nanocrystals.

Details for the semiconductor nanocrystal, the first polymer, and the second polymer are the same as set forth above.

Hereinafter, the present invention is illustrated in more detail with reference to specific examples. However, they are exemplary embodiments of the present invention, and the present invention is not limited thereto.

EXAMPLES

Reference Example 1

Production of InZnP/SnSeS Semiconductor Nanocrystal-Polymer Composite Particle (Prior to the Low Temperature Grinding)

(1) 0.058 grams (g) of indium acetate, 0.0183 g of zinc acetate, 0.204 g of palmitic acid, and 10 milliliters (mL) of 1-octadecene are placed in a flask, subjected to a vacuum at 120° C. for one hour, and then heated to 280° C. after the atmosphere in the flask is exchanged with $N_2$. After the temperature is stabilized at 280° C., a mixed solution of 0.43 μL of tris(trimethylsilyl)phosphine and 1 mL of trioctylphosphine ("TOP") is quickly injected and the reaction proceeds for 10 minutes. Then, the mixture is rapidly cooled and acetone is added thereto to produce nanocrystals, which are then separated by centrifugation and dispersed in toluene. The first UV absorption maximum of the prepared InZnP core nanocrystals is 440~460 nm. 0.056 g of zinc acetate, 0.189 g of oleic acid, and 10 mL of trioctylamine are placed in a flask, subjected to a vacuum at 120° C. for 10 minutes, and then heated to 220° C. after the atmosphere in the flask is exchanged with $N_2$. The InZnP core nanocrystals are quickly (e.g., within 10 seconds) injected into the flask, and a mixed solution of 0.01 millimoles (mmol) of Se/TOP and 0.05 mmol S/TOP is slowly injected. The resulting mixture is heated to 280° C. and the reaction proceeds for 20 minutes. The mixture is further heated to 320° C. The following three mixed solutions of Se and S are injected sequentially. After injection each solution, the reaction proceeds for 10 minutes. Three mixed solutions are a first mixed solution of 0.01 mmol of Se/TOP+0.08 mmol of S/TOP, a second mixed solution of 0.01 mmol of Se/TOP+0.12 mmol of S/TOP, and a third mixed solution of 0.01 mmol of Se/TOP+0.15 mmol of S/TOP. Thereafter, 0.15 mmol of S/TOP is added thereto and the reaction further proceeds for 20 minutes. After the reaction, the resulting product is cooled down to the room temperature. The obtained nanocrystals are separated via centrifugation and then dispersed in toluene. The resulting semiconductor nanocrystals have a composition of InZnP/ZnSeS and emit a green light with a photoluminescence wavelength of 525 nm.

(2) The green light-emitting nanocrystals prepared in section (1) are dispersed in toluene to obtain a semiconductor nanocrystal dispersion with an optical density of 0.04. 1 g of polyethylene-co-polyacrylic acid copolymer (including 15 wt % of polyacrylic acid, Tm 87° C.) is dissolved in 4 mL of toluene and heated to 100° C. To this solution, 4 mL of the semiconductor nanocrystal dispersion is added dropwise and the reaction continues for 30 minutes. After the reaction, the resulting mixture is cooled down to 50° C. Precipitates are filtered, washed with hexane several times, and then dried. The dried precipitates are manually ground in a mortar, further washed with hexane and vacuum dried for 12 hours to prepare InZnP/SnSeS semiconductor nanocrystal-polymer composite particles.

The optical microscopy image (magnification of 50×) for the composite particles thus obtained (prior to the low temperature grinding) is shown in FIG. 1.

Example 1

Using Hexane as an Inert Organic Solvent

The semiconductor nanocrystal-polymer composite particle prepared in the Reference Example 1 is subjected to the low temperature grinding using a cryogenic ball milling device (manufactured by JAS (Japan Analytical Industry), JFC-2000). A mixture of 1 g of the InZnP/SnSeS semiconductor nanocrystal-polymer composite particles prepared in the Reference Example 1 and 1 g of hexane is placed in a container with balls for the cryogenic milling. The container is closed, and then a milling rod is connected. The container is immersed and maintained in liquid nitrogen for five minutes. Then, the cryogenic milling is conducted at a frequency of 50 Hertz (Hz) for four cycles. One cycle is five minute milling and a five minute break. After the cryogenic milling, the container is removed from liquid nitrogen and allowed to warm to room temperature. Then, the resulting slurry including hexane and the semiconductor nanocrystal-polymer composite fine particles after the grinding are recovered. The recovered slurry is washed with hexane and dried under vacuum at room temperature for 12 hours to obtain the ground fine particles of the semiconductor nanocrystal-polymer composite. The average particle size, size distribution, and quantum efficiency of the fine particles are measured in the same manner as set forth in the reference example. The results are compiled in Table 1. An LED is manufactured using the ground fine particles, and is driven at a current of 120 mA to measure luminous efficacy (Lumen/W). The results are summarized in Table 1.

Examples 2 to 5

Using Hexane as an Inert Organic Solvent

The ground fine particles of the semiconductor nanocrystal-polymer composite are prepared as according to Example 1, except for changing the amount of hexane and the repetition number of cycles as shown in Table 1.

Figure 2:
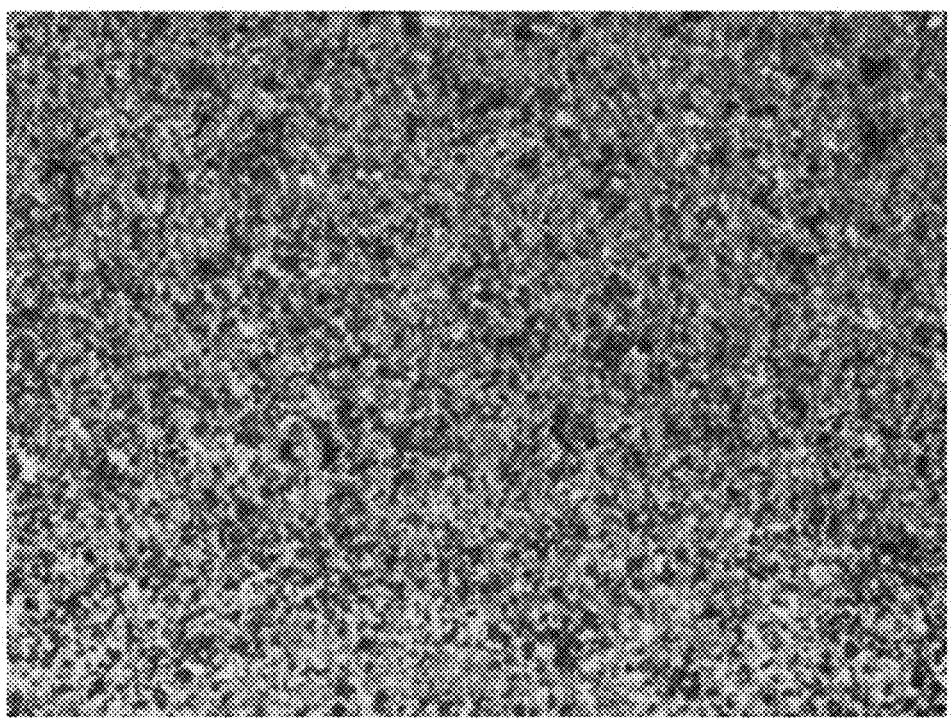
FIG. 2 shows a 50× micrograph image of the composite fine particles obtained in Example 2 (after the low temperature grinding)

An optical microscope image (50×) of the ground find particles obtained in Example 2 is shown in FIG. 2.

Comparative Example 1

The ground fine particles of the semiconductor nanocrystal-polymer composite are prepared in the same manner as Example 1, except that hexane is not used.

Particle Size Analysis

For the composite particles and ground fine particles thus obtained, the average size and the standard deviation are measured in the following manner and the results are summarized in Table 1. Using an optical microscope, an image with magnification of 50× of the particles is obtained, and in the image, about 10 to 20 particles having a relatively larger size (bigger than 10 μm) are selected to measure their sizes, respectively. From the measured values, an average and a standard deviation are calculated.

Preparation of Encapsulating Composition and Encapsulation of the Composite

A thiol-ene composition is obtained by mixing pentaerythritol tetrakis(3-mercaptopropionate) and 1,3,5-triallyl-1,3,5-triazine-2,4,6-trione at a mole ratio of 1:1, and adding oxy-phenyl-acetic acid 2-[2-oxo-2-phenyl-acetoxy-ethoxy]-ethyl ester in an amount of 1 wt % thereto. The thiol-ene composition is used as an encapsulating material. The semiconductor nanocrystal-polymer composite particles are added to have a same amount of Indium (In) (0.05% by weight based on the total weight of the encapsulating material), and the resulting mixture is prepared as a light emitting device.

Quantum Efficiency Analysis

Quantum efficiency of the obtained semiconductor nanocrystal-polymer composite is measured in the following manner and the results are summarized in Table 1. The photoluminescence spectrum of a blue LED (GaN LED, 446~449 nm emission) is obtained in an integrating sphere equipped in a CAS 140 CT spectrometer while 120 milliamperes (mA) of current is applied. The curves of the spectrum are integrated to calculate the total intensity of the (blue) radiation. The thiol-ene resin composite including the green nanocrystal and the polymer is placed on the same LED and the spectrum thereof is measured while 120 mA of current is applied, and the intensity of the blue radiation (about 400 to 500 nm) (i.e., the intensity of the blue radiation after green conversion) and the intensity of the green radiation (about 500 to 600 nm) are calculated in a similar way. The quantum efficiency is calculated by the following equation.

[The intensity of the green radiation]/{[The total intensity of the blue radiation]−[The intensity of the blue radiation after green conversion]}× 100%

TABLE 1

| Sample | Amount of hexane | Cycles | Particle size (μm) (standard deviation) | QE (%) (standard deviation) | emission peak (nm) | FWHM (nm) | lm/W |
|---|---|---|---|---|---|---|---|
| Reference example 1 | — | 0 (prior to milling) | 324 (±169) | 48.8 (±3.4) | 541 | 39 | 21.4 |
| Comparative Example 1 | — | 4 | 36 (±19) | 29.0 (±1.2) | 541 | 39 | 22.1 |
| Example 1 | 1 g | 4 | 36 (±16) | 46.4 (±0.9) | 542 | 38 | 32.4 |
| Example 2 | 2 g | 4 | 52 (±18) | 44.9 (±1.0) | 542 | 38 | 30.7 |

TABLE 1-continued

| Sample | Amount of hexane | Cycles | Particle size (μm) (standard deviation) | QE (%) (standard deviation) | emission peak (nm) | FWHM (nm) | lm/W |
|---|---|---|---|---|---|---|---|
| Example 3 | 2 g | 8 | 32 (±13) | 48.0 (±1.2) | 541 | 38 | 30.7 |
| Example 4 | 3 g | 4 | 64 (±27) | 46.9 (±1.8) | 541 | 38 | 30.6 |
| Example 5 | 5 g | 4 | 76 (±36) | 47.0 (±1.3) | 541 | 38 | 28.4 |
| | 2 g | 4 | — | — | — | — | — |

FWHM = full width at half maximum;
lm/W = lumens per watt

The results of Table 1 confirm that Examples 1 to 6 using hexane in an amount of one to five times of the weight of the composite provides a composite having fine particles and having an average particle size of several microns with a relatively narrow distribution of particle sizes. In particular, the quantum efficiency is not particularly changed before and after the grinding. By contrast, the comparative example produces composite fine particles having an average particle size of several micrometers, but the quantum efficiency of the ground fine particles is only about 60% compared to that of the composite prior to the grinding.

Such a difference in the quantum efficiencies may be translated into a difference in luminous efficiency of the corresponding devices. That is, the device manufactured using the composite fine particles of Examples 1 to 5 may exhibit remarkably enhanced luminous efficiency in comparison with the device manufactured using the composite (fine) particles of the Reference Example and the Comparative Example.

Reference Example 2

The semiconductor nanocrystal-polymer composite particles prior to being subjected to low temperature grinding are prepared in the same manner as the Reference Example 1.

Example 6

The ground fine particles of the semiconductor nanocrystal-polymer composite are prepared in the same manner as Example 1, except for using 2 g of hexane.

Example 7

Using Hexane and a Silicone Resin

A mixture of 1 g of the semiconductor nanocrystal-polymer composite particles prepared in the reference example, 2 g of hexane, and 0.1 g of a silicone resin (purchased from Dow Corning, Co. Ltd., OE6630) is placed in a container with milling balls for the cryogenic milling. The container is closed, and then a milling rod is connected. The container is immersed and maintained in liquid nitrogen for five minutes. Then, the cryogenic milling is conducted at a frequency of 50 Hz for four cycles. After the milling, the container is removed from the liquid nitrogen and allowed to warm to near to room temperature. The resulting slurry including hexane, the silicone resin, and the semiconductor nanocrystal—polymer composite fine particles after the grinding are recovered. The recovered slurry is dried under vacuum at room temperature for 12 hours to obtain the ground fine particles of the semiconductor nanocrystal—polymer composite coated with the silicone resin.

The composite particles of Reference Example 2, the ground fine particles of the composite of Example 2, and the ground fine particles of the composite of Example 7 are dispersed in a desired amount of OE 6630 resin (the resin used in Example 7) as an encapsulating material and cured to manufacture LED 1, LED 2, and LED 3, respectively. For each of LED 1, LED 2, and LED 3 thus obtained, the average particle size, size distribution, and quantum efficiency are measured. The results are summarized in Table 2. The optical microscope images of LED 1, LED 2, and LED 3 are shown in FIG. 3.

TABLE 2

| | Minimum (μm) | Maximum (μm) | AVG (μm) | Standard deviation | The number of particles |
|---|---|---|---|---|---|
| Reference example 2 | 73.95 | 340.56 | 158.44 | ±79.46 | 20 |
| Example 6 | 22.01 | 57.15 | 37.69 | ±8.57 | 20 |
| LED 1 | 130.01 | 293.45 | 203.1 | ±49.85 | 10 |
| LED 2 | 46.85 | 367.86 | 192.09 | ±81.14 | 11 |
| LED 3 | 25.42 | 57.28 | 40.99 | ±12.29 | 10 |

Figure 3A:
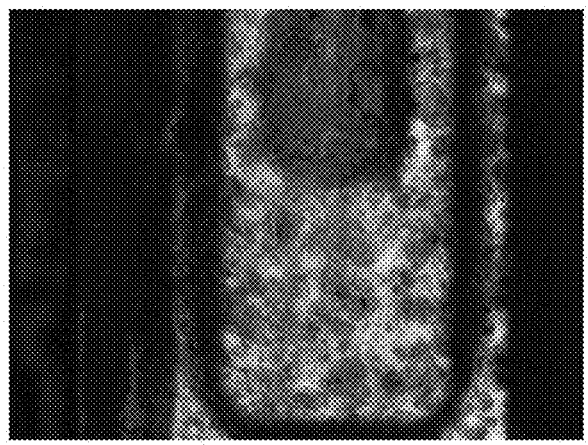
FIGS. 3A-3C show 50× micrograph images of the light emitting devices 1, 2, and 3, respectively, of Example 7.
Figure 3B:
Figure 3C:
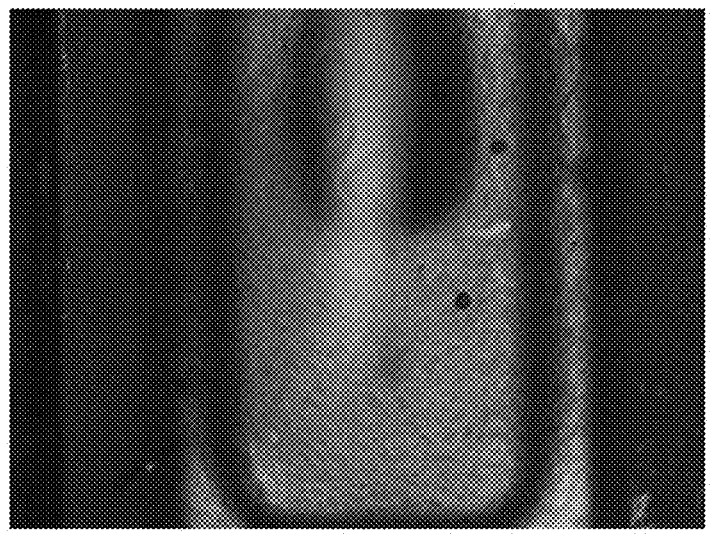

From the results of Table 2 and FIG. 3, the following are confirmed.

The composite particles being ground to have an average particle size of less than or equal to 50 μm may exhibit agglomeration when they are dispersed in the encapsulating material due to their poor compatibility. However, the resin and the composite fine particles obtained from the low temperature grinding in the presence of the inert organic solvent may not undergo agglomeration even when they are mixed with the encapsulating resin and cured.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A method of grinding semiconductor nanocrystal-polymer composite particles, the method comprising:
   obtaining semiconductor nanocrystal-polymer composite particles comprising a semiconductor nanocrystal and a first polymer;
   contacting the semiconductor nanocrystal-polymer composite with an inert organic solvent; and low-temperature grinding the semiconductor nanocrystal-polymer composite particles in the presence of the inert organic solvent to prepare semiconductor nanocrystal-polymer composite fine particles.

2. The method of claim 1, wherein the obtaining of the semiconductor nanocrystal-polymer composite comprises:
obtaining semiconductor nanocrystals;
dissolving a first polymer in an organic solvent to prepare a first polymer solution; and
mixing the first polymer solution with the semiconductor nanocrystals to obtain the semiconductor nanocrystal-polymer composite particles.

3. The method of claim 1, wherein the contacting of the semiconductor nanocrystal-polymer composite particles with the inert organic solvent further comprises contacting the semiconductor nanocrystal-polymer composite with the inert organic solvent and a second polymer or a monomeric composition thereof.

4. The method of claim 2, wherein the mixing of the first polymer solution with the semiconductor nanocrystals comprises heating the first polymer solution and contacting the heated first polymer solution with the semiconductor nanocrystals.

5. The method of claim 1, wherein the semiconductor nanocrystals comprise a Group II-VI compound, a Group III-V compound, a Group IV-VI compound, a Group IV compound, or a combination thereof.

6. The method of claim 5, wherein the Group II-VI compound is a binary element compound and is CdSe, CdTe, ZnS, ZnSe, ZnTe, ZnO, HgS, HgSe, HgTe, MgSe, MgS, or a combination thereof, a ternary element compound and is CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, or a combination thereof, or a quaternary element compound and is HgZnTeS, CdZnSeS, CdZnSeTe, CdZn-STe, CdHgSeS, CdHgSeTe, CdHgSTe, HgZnSeS, HgZnSeTe, or a combination thereof;
wherein the Group III-V compound semiconductor is a binary element compound and is GaN, GaP, GaAs, GaSb, AlN, AlP, AlAs, AlSb, InN, InP, InAs, InSb, or a combination thereof, a ternary element compound and is GaNP, GaNAs, GaNSb, GaPAs, GaPSb, AlNP, AlNAs, AlNSb, AlPAs, AlPSb, InNP, InNAs, InNSb, InPAs, InPSb, GaAlNP, or a combination thereof, or a quaternary element compound and is GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, or a combination thereof;
wherein the Group IV-VI compound is a binary element compound and is SnS, SnSe, SnTe, PbS, PbSe, PbTe, or a combination thereof, a ternary element compound and is SnSeS, SnSeTe, SnSTe, PbSeS, PbSeTe, PbSTe, SnPbS, SnPbSe, SnPbTe, or a combination thereof, or a quaternary element compound and is SnPbSSe, SnPb-SeTe, SnPbSTe, or a combination thereof; and
wherein the Group IV compound is a singular element and is Si, Ge, or a combination thereof, or a binary element compound and is SiC, SiGe, or a combination thereof.

7. The method of claim 1, wherein the semiconductor nanocrystals have a core-shell structure.

8. The method of claim 1, wherein the first polymer is a polyacrylate, a polymethacrylate, a polyacrylic acid, a polyacrylic acid salt, polymethacrylic acid, a polymethacrylic acid salt, a polyolefin, polystyrene, a poly(alkylene-co-acrylic acid), a poly(alkylene-co-acrylic acid salt), a poly(alkylene-co-methacrylic acid), a poly(alkylene-co-methacrylic acid salt), poly(styrene-co-acrylic acid), poly(styrene-co-methacrylic acid), poly(styrene-co-thiol terminated ethylene), a thiol-ene copolymer, a polyamide, a polyimide, a polyisocyanate, a polythiol, a polyester, a derivative thereof, or a combination thereof.

9. The method of claim 1, wherein the first polymer comprises a functional group, and wherein the functional group is —COOR wherein R is hydrogen, a monovalent organic group, or a monovalent to trivalent metal ion; —RCOOR' wherein R is a substituted or unsubstituted C1 to C10 alkylene and R' is hydrogen, a monovalent organic group, or a monovalent to trivalent metal ion; a substituted or unsubstituted C2 to C20 alkenyl group; a substituted or unsubstituted C2 to C20 alkynyl group; a halogen; an —ROR' group wherein R is a substituted or unsubstituted C1 to C10 alkylene group, and R' is hydrogen, a monovalent organic functional group, or a monovalent to trivalent metal ion; an acyl halide group of the formula —RC(=O)X wherein R is a substituted or unsubstituted C1 to C10 alkylene group, and X is F, Cl, Br, or I; —C(=O)NRR' wherein R and R' are each independently hydrogen, a monovalent organic functional group, or a monovalent to trivalent metal ion; an amine group of the formula —NRR' wherein R and R' are each independently hydrogen or a monovalent organic functional group; an imine group of the formula —C(=NR') wherein R' is hydrogen, a monovalent organic functional group, or a monovalent to trivalent metal ion; an imide group of the formula —C(=O)N(R')C(=O) wherein R' is hydrogen, a monovalent organic functional group, or a monovalent to trivalent metal ion; an isocyanate group of the formula —N=C=O; an acrylate group of the formula —OC(=O)—C(H)=CH$_2$); a methacrylate group of the formula —OC(=O)—C(CH$_3$)=CH$_2$); a thiol group of the formula —SH); a phosphine oxide group of the formula —P(=O)R'R" wherein R' and R" are each independently hydrogen, a monovalent organic functional group, or a monovalent to trivalent metal ion; a sulfonate group of the formula —SO$_3$R' wherein R' is hydrogen, a monovalent organic functional group, or a monovalent to trivalent metal ion; a nitro group of the formula —NO$_2$), or a combination thereof.

10. The method of claim 1, wherein the inert organic solvent is a C6 to C12 aliphatic hydrocarbon, a C6 to C12 aromatic hydrocarbon, a C6 to C12 halogenated hydrocarbon, a C1 to C8 alcohol, a phosphine substituted with at least one C3 to C10 alkyl group, a C1 to C6 nitrile, an amine substituted with at least one C1 to C10 alkyl group, or a combination thereof.

11. The method of claim 1, wherein an amount of the inert organic solvent is about 0.5 to about 10 times by weight of the semiconductor nanocrystal-polymer composite.

12. The method of claim 3, wherein the second polymer comprises a silicone resin, an epoxy resin, poly(meth)acrylate, an organic/inorganic hybrid polymer, a polycarbonate, polystyrene, a polyolefin, a copolymer of a first monomer having at least two thiol groups at an end thereof and a second monomer having at least two carbon-carbon unsaturated bonds at an end thereof, a derivative thereof, or a combination thereof, and the monomeric composition of the second polymer comprises a silicone monomer, an epoxy monomer, an acrylate monomer, an organic/inorganic hybrid monomer, monomers for polycarbonate, a styrene monomer, an olefin monomer, a mixture of a compound with at least two thiol groups and a compound with at least two carbon-carbon unsaturated bonds, a derivative thereof, or combination thereof.

13. The method of claim 3, wherein an amount of the second polymer is less than or equal to about five times of an amount of the semiconductor nanocrystal-polymer composite particles by weight.

14. The method of claim 1, wherein the low temperature grinding is conducted at a temperature of less than or equal to about 273 K.

15. The method of claim 1, wherein the low temperature grinding provides a population of semiconductor nanocrystal-polymer composite fine particles having an average diameter of about 100 μm or less when particles of the semiconductor nanocrystal-polymer composite having a diameter of greater than 10 micrometers are measured.

16. A population of semiconductor nanocrystal-polymer composite fine particles comprising:
   semiconductor nanocrystal-polymer composite particles including semiconductor nanocrystals, a first polymer on the semiconductor nanocrystals, and optionally a second polymer or a monomeric composition thereof on the first polymer,
   wherein the population of semiconductor nanocrystal-polymer composite particles has an average particle size of about 100 micrometers or less when semiconductor nanocrystal-polymer composite particles having a diameter of greater than 10 micrometers are measured, and
   wherein the population of semiconductor nanocrystal-polymer composite particles has a quantum efficiency of about 40% or greater.

17. The population of semiconductor-polymer composite fine particles of claim 16, wherein the quantum efficiency of the population of the semiconductor nanocrystal-polymer composite fine particles is greater than or equal to about 70% of a quantum efficiency of a population of semiconductor nanocrystal-polymer composite particles prior to being ground.

18. The population of semiconductor-polymer composite fine particles of claim 16, wherein the first polymer is a polyacrylate, a polymethacrylate, a polyacrylic acid, a polyacrylic acid salt, polymethacrylic acid, a polymethacrylic acid salt, a polyolefin, polystyrene, a poly(alkylene-co-acrylic acid), a poly(alkylene-co-acrylic acid salt), a poly(alkylene-co-methacrylic acid), a poly(alkylene-co-methacrylic acid salt), poly(styrene-co-acrylic acid), poly(styrene-co-methacrylic acid), poly(styrene-co-thiol terminated ethylene), a thiol-ene copolymer, a polyamide, a polyimide, a polyisocyanate, a polythiol, a polyester, a derivative thereof, or a combination thereof.

19. The population of semiconductor-polymer composite fine particles of claim 16, further comprising the second polymer or the monomeric composition thereof,
   wherein the second polymer is a silicone resin, an epoxy resin, a poly(meth)acrylate, an organic/inorganic hybrid polymer, a polycarbonate, polystyrene, a polyolefin, a copolymer of a first monomer having at least two thiol groups at an end thereof and a second monomer having at least two carbon-carbon unsaturated bonds at an end thereof, a derivative thereof, or a combination thereof, and the monomeric composition of the second polymer comprises a silicone monomer, an epoxy monomer, an acrylate monomer, an organic/inorganic hybrid monomer, monomers for polycarbonate, a styrene monomer, an olefin monomer, a mixture of a compound with at least two thiol groups at an end thereof and a compound with at least two carbon-carbon unsaturated bonds at an end thereof, a derivative thereof, or combination thereof.

20. The population of semiconductor-polymer composite fine particles of claim 16, wherein the first polymer surrounds the semiconductor nanocrystals.

21. The population of semiconductor-polymer composite fine particles of claim 16, wherein the second polymer is on and surrounds first polymer, which surrounds the semiconductor nanocrystals.

22. A method of grinding semiconductor nanocrystal-polymer composite particles, the method comprising:
   disposing a semiconductor nanocrystal-polymer composite particles and an inert solvent in a container; and
   conducting a mechanical process comprising low-temperature grinding which is adapted to change a physical property of the semiconductor nanocrystal-polymer composite particles,
   wherein the solvent transfers heat during the mechanical process.

* * * * *